United States Patent
Tasaka et al.

(10) Patent No.: US 10,072,194 B2
(45) Date of Patent: *Sep. 11, 2018

(54) WORKING FLUID FOR HEAT CYCLE

(71) Applicant: ASAHI GLASS COMPANY, LIMITED, Chiyoda-ku (JP)

(72) Inventors: Mai Tasaka, Chiyoda-ku (JP); Masato Fukushima, Chiyoda-ku (JP); Satoshi Kawaguchi, Chiyoda-Ku (JP); Tomoaki Taniguchi, Chiyoda-ku (JP); Yu Takeuchi, Chiyoda-ku (JP)

(73) Assignee: Asahi Glass Company, Limited, Chiyoda-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/229,724

(22) Filed: Aug. 5, 2016

(65) Prior Publication Data

US 2016/0340565 A1    Nov. 24, 2016

Related U.S. Application Data

(63) Continuation of application No. PCT/JP2015/054637, filed on Feb. 19, 2015.

(30) Foreign Application Priority Data

Feb. 20, 2014 (JP) .................. 2014-030855
Jun. 20, 2014 (JP) .................. 2014-127747
Jul. 18, 2014 (JP) .................. 2014-148346

(51) Int. Cl.
*C09K 5/04* (2006.01)

(52) U.S. Cl.
CPC ........ *C09K 5/045* (2013.01); *C09K 2205/122* (2013.01); *C09K 2205/126* (2013.01); *C09K 2205/22* (2013.01)

(58) Field of Classification Search
CPC .............. C09K 5/045; C09K 2205/126; C09K 2205/22; C09K 2205/122
See application file for complete search history.

(56) References Cited

U.S. PATENT DOCUMENTS

2010/0090156 A1    4/2010   Nappa et al.
2010/0191024 A1    7/2010   Uenveren et al.
2014/0070132 A1    3/2014   Fukushima
(Continued)

FOREIGN PATENT DOCUMENTS

JP    2010-533151        10/2010
WO    WO 2012/157762 A1  11/2012
(Continued)

OTHER PUBLICATIONS

International Search Report dated Apr. 7, 2015 in PCT/JP2015/054637, filed on Feb. 19, 2015.

*Primary Examiner* — John R Hardee
(74) *Attorney, Agent, or Firm* — Oblon, McClelland, Maier & Neustadt, L.L.P.

(57) ABSTRACT

To provide a working fluid for heat cycle, which has less influence over the ozone layer and has less influence over global warming, and which has favorable cycle performance. A working fluid for heat cycle, which contains trifluoroethylene and difluoroethylene, wherein the proportion of the content of difluoroethylene is less than 1.5 mass % based on the working fluid.

11 Claims, 1 Drawing Sheet

(56) References Cited

U.S. PATENT DOCUMENTS

2015/0376486 A1* 12/2015 Hashimoto ............ C09K 5/045
  252/67
2016/0002518 A1* 1/2016 Taniguchi .............. C09K 5/044
  252/67

FOREIGN PATENT DOCUMENTS

| WO | WO 2012/157764 A1 | 11/2012 |
| WO | WO 2014/178352 A1 | 11/2014 |
| WO | WO 2014/178353 A1 | 11/2014 |

* cited by examiner

WORKING FLUID FOR HEAT CYCLE

TECHNICAL FIELD

The present invention relates to a working fluid for heat cycle.

BACKGROUND ART

Heretofore, as a working fluid for heat cycle such as a refrigerant for a refrigerator, a refrigerant for an air-conditioning apparatus, a working fluid for a power generation system (such as exhaust heat recovery power generation), a working fluid for a latent heat transport apparatus (such as a heat pipe) or a secondary cooling fluid, a chlorofluorocarbon (CFC) such as chlorotrifluoromethane (CFC-13) or dichlorodifluoromethane (CFC-12), or a hydrochlorofluorocarbon (HCFC) such as chlorodifluoromethane (HCFC-22) has been used. However, influences of CFCs and HCFCs over the ozone layer in the stratosphere have been pointed out, and their use is regulated at present.

In this specification, abbreviated names of halogenated hydrocarbon compounds are described in brackets after the compound names, and in this specification, the abbreviated names are employed instead of the compound names as the case requires.

Under the above conditions, as a working fluid for heat cycle, a hydrofluorocarbon (HFC) which has less influence over the ozone layer, such as difluoromethane (HFC-32), tetrafluoroethane (HFC-134) or pentafluoroethane (HFC-125), has been used instead of CFCs and HCFCs. For example, R410A (a pseudoazeotropic mixture refrigerant of HFC-32 and HFC-125 in a mass ratio of 1:1) is a refrigerant which has been widely used. However, it has been pointed out that HFCs may cause global warming. Accordingly, development of a working fluid for heat cycle which has less influence over the ozone layer and has a low global warming potential (GWP) is an urgent need.

In recent years, as a working fluid for heat cycle which has less influence over the ozone layer and has less influence over global warming, a hydrofluoroolefin (HFO) having a carbon-carbon double bond which is easily decomposed by OH radicals in the air has been expected. In this specification, a saturated HFC is represented as a HFC and is distinguished from a HFO having a carbon-carbon double bond unless otherwise specified.

As a working fluid using a HFO, for example, Patent Document 1 discloses a composition containing trifluoroethylene (HFO-1123). Patent Document 1 discloses use of HFO-1123 with various HFCs or HFOs in combination for the purpose of increasing the flame retardancy, the cycle performance, etc. of the working fluid.

As mentioned above, a working fluid containing HFO-1123, which is excellent in the cycle performance, has been desired.

HFO-1123 is produced by various processes, and impurities are present in the formed product by any production process. And, if such HFO-1123 containing impurities (hereinafter sometimes referred to as crude HFO-1123) is used as it is, a working fluid excellent in the cycle performance may not be obtained in some cases.

Accordingly, to use HFO-1123 for a working fluid, a step of reducing impurities from the crude HFO-1123 is essential.

PRIOR ART DOCUMENT

Patent Document

Patent Document 1: WO2012/157764

DISCLOSURE OF INVENTION

Technical Problem

The object of the present invention is to provide a working fluid for heat cycle which has less influence over the ozone layer and has less influence over global warming, which is excellent in cycle performance, and which can be produced with high productivity. Further, the present invention is to simplify a step of reducing impurities from crude HFO-1123.

Solution to Problem

The present inventors have conducted extensive studies and as a result, found that the above object can be achieved by using a working fluid containing HFO-1123 and having a low content of difluoroethylene, and accomplished the present invention.

That is, the present invention provides a working fluid for heat cycle, which contains HFO-1123 and difluoroethylene, wherein the proportion of the content of difluoroethylene is less than 1.5 mass % based on the working fluid.

Advantageous Effects of Invention

The working fluid for heat cycle of the present invention (hereinafter sometimes referred to as a working fluid) has less influence over the ozone layer and has less influence over global warming. Further, the working fluid for heat cycle is excellent in cycle performance, since the content of difluoroethylene present as impurities in production of HFO-1123 is reduced to be less than 1.5 mass % based on the entire amount of the working fluid.

DESCRIPTION OF EMBODIMENTS

Working Fluid

The working fluid according to an embodiment of the present invention contains HFO-1123 and difluoroethylene, wherein the proportion of the content of difluoroethylene is less than 1.5 mass % based on the working fluid.

The working fluid according to this embodiment may further contain a compound described hereinafter, in addition to HFO-1123 and difluoroethylene.

<HFO-1123>

HFO-1123 has a low global warming potential (GWP), has less influence over the ozone layer and has less influence over global warming. Further, HFO-1123 is excellent in the performance as the working fluid and is particularly excellent in cycle performance (for example, coefficient of performance and refrigerating capacity obtained by the after-mentioned method).

The content of HFO-1123 is preferably at least 8.5 mass %, more preferably at least 20 mass %, further preferably at least 30 mass %, particularly preferably at least 40 mass % based on the working fluid (100 mass %), in view of cycle performance.

HFO-1123 is known to decompose when used by itself at high temperature or with an ignition source under high pressure, that is, to be self-decomposable. With a view to preventing self-decomposition reaction of HFO-1123, the content of HFO-1123 is preferably at most 80 mass %, more preferably at most 70 mass %, most preferably at most 60 mass %, based on the entire amount of the working fluid.

With respect to the working fluid of the present invention, the self-decomposition reaction may be suppressed by lowering the content of HFO-1123 by mixing HFO-1123 with the after-mentioned HFC-32 or the like. When the content of HFO-1123 is at most 80 mass %, HFO-1123 is not self-decomposable under temperature and pressure conditions under which it is applied to a heat cycle system, and thus a working fluid with high durability will be obtained.

<Difluoroethylene>

Difluoroethylene is a compound which forms in production of HFO-1123 as a by-product and is present as an impurity in the formed composition. As difluoroethylene, 1,1-difluoroethylene (HFO-1132a) and E- and/or Z-1,2-difluoroethylene (HFO-1132) may be mentioned. E- and/or Z- means a mixture of an E-form and a Z-form and is also represented as E/Z-.

If the working fluid contains difluoroethylene, its cycle performance tends to be low. However, when the content of difluoroethylene is less than 1.5 mass % based on the entire amount of the working fluid, a working fluid having a sufficiently excellent cycle performance will be obtained. The content of difluoroethylene is more preferably less than 1.0 mass %, particularly preferably at most 0.5 mass % based on the entire amount of the working fluid.

Further, the content of difluoroethylene is preferably at least 4 ppm, more preferably at least 50 ppm, most preferably at least 100 ppm, based on the entire amount of the working fluid. When the content is at least 4 ppm, a step of purifying crude HFO-1123 to reduce difluoroethylene as an impurity can be simplified.

<HFC and/or HFO>

The working fluid of the present invention may further contain a hydrofluorocarbon (HFC) and another hydrofluoroolefin (HFO) in addition to HFO-1123 and difluoroethylene.

In view of less influence over the ozone layer and excellent cycle performance, the HFC may, for example, be difluoromethane (HFC-32), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) and pentafluoroethane (HFC-125). Such HFCs may be used alone or in combination of two or more. Among them, HFC-32 is particularly preferred.

In view of less influence over the ozone layer and excellent cycle performance, another HFO may, for example, be 2,3,3,3-tetrafluoropropene (HFO-1234yf), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf). Such HFCs may be used alone or in combination of two or more. Among them, preferred is HFO-1234yf, HFO-1234ze(E) or HFO-1234ze (Z) which has a high critical temperature and is excellent in the durability and cycle performance, and particularly preferred is HFO-1234yf or HFO-1234ze(E).

<HFC-32>

In a case where the working fluid of the present invention contains HFC-32, with respect to the proportions of the contents of HFO-1123 and HFC-32, based on the total amount of HFO-1123 and HFC-32 of 100 mass %, it is preferred that the proportion of HFO-1123 is from 1 to 99 mass % and the proportion of HFC-32 is from 99 to 1 mass %. Particularly a composition having a proportion of HFO-1123 of 90 mass % and a proportion of HFC-32 of 10 mass % has a very small difference in the composition ratio between gaseous and liquid phases and is an azeotropic composition and is thereby excellent in the stability.

Further, the sum of the content of HFO-1123 and the content of HFC-32 (hereinafter referred to simply as the total amount) is preferably at least 80 mass %, more preferably at least 90 mass % based on the entire amount of the working fluid. The content of HFO-1123 is preferably at least 40 mass %, more preferably at least 60 mass % based on the entire amount of the working fluid.

<HFO-1234yf>

In a case where the working fluid of the present invention contains HFO-1234yf, the proportion of the content of HFO-1123 based on the total amount of HFO-1123 and HFO-1234yf is preferably from 35 to 95 mass %, more preferably from 40 to 95 mass %, further preferably from 50 to 90 mass %, still more preferably from 50 to 85 mass %, most preferably from 60 to 85 mass %.

The proportion of the total amount of HFO-1123 and HFO-1234yf based on the entire amount of the working fluid is preferably from 70 to 100 mass %. It is more preferably from 80 to 100 mass %, further preferably from 90 to 100 mass %, particularly preferably from 95 to 100 mass %. When the total amount of HFO-1123 and HFO-1234yf is within the above range, GWP can be kept low, and the efficiency can be further increased while a certain performance is maintained when the working fluid is used for heat cycle, whereby favorable cycle performance will be obtained.

<HFO-1234ze(E)>

In a case where the working fluid of the present invention contains HFO-1234ze(E), the proportion of the content of HFO-1123 based on the total amount of HFO-1123 and HFO-1234ze(E) is preferably from 35 to 95 mass %, more preferably from 40 to 95 mass %, further preferably from 50 to 90 mass %, still more preferably from 50 to 85 mass %, most preferably from 60 to 85 mass %.

The proportion of the total amount of HFO-1123 and HFO-1234ze(E) based on the entire amount of the working fluid is preferably from 70 to 100 mass %, more preferably from 80 to 100 mass %, further preferably from 90 to 100 mass %, particularly preferably from 95 to 100 mass %. When the total amount of HFO-1123 and HFO-1234ze(E) is within the above range, GWP can be kept low, and the efficiency can be further improved while a certain performance is maintained when the working fluid is used for heat cycle, whereby favorable cycle performance will be obtained.

Further, in a case where the working fluid of the present invention contains HFC-32 and (HFO-1234yf or HFO-1234ze(E)), the total amount of HFO-1123, HFC-32 and (HFO-1234yf or HFO-1234ze(E)), is preferably larger than 90 mass % and at most 100 mass % based on the entire amount of the working fluid. Further, based on the total amount of HFO-1123, HFC-32 and (HFO-1234yf or HFO-1234ze(E)), it is preferred that the proportion of HFO-1123 is at least 8.5 mass % and less than 70 mass %, the proportion of HFC-32 is at least 30 mass % and at most 75 mass %, and the proportion of (HFO-1234yf or HFO-1234ze (E)) is at most 50 mass %. The proportion of (HFO-1234yf or HFO-1234ze(E)) is more preferably at most 40 mass %, most preferably at most 30 mass %.

When the proportions of the respective components such as HFO-1123 are within the above ranges, a working fluid which has less influence over global warming and with which practically sufficient cycle performance can be obtained when used for heat cycle, can be obtained.

In a case where the working fluid of the present invention contains HFO-1123, HFO-1234yf and HFC-32, another preferred composition range (P) will be described below.

In the respective formulae illustrating the composition range (P), the abbreviated names of the compounds represent the proportions (mass %) of the compounds based on the total amount of HFO-1123, HFO-1234yf and HFC-32. The same applies to the composition ranges (R), (L) and (M).

<Composition Range (P)>
  70 mass %≤HFO-1123+HFO-1234yf
  30 mass %≤HFO-1123≤80 mass %
  HFO-1234yf≤40 mass %
  0 mass %<HFC-32≤30 mass %
  HFO-1123/HFO-1234yf≤95/5 mass %

The working fluid in the above composition is a working fluid having respective characteristics of HFO-1123, HFO-1234yf and HFC-32 in a balanced manner, and having defects of the respective components suppressed. That is, the working fluid is a working fluid which has a very low GWP, has a small temperature glide and has a certain performance and efficiency when used for heat cycle, and thus with such a working fluid, favorable cycle performance will be obtained.

As a more preferred composition of the working fluid in the present invention, a composition containing HFO-1123 in a proportion of from 30 to 70 mass %, HFO-1234yf in a proportion of from 4 to 40 mass % and HFC-32 in a proportion of from 0 to 30 mass % based on the total amount of HFO-1123, HFO-1234yf and HFC-32, and having a content of HFO-1123 being at most 70 mol % based on the entire amount of the working fluid, may be mentioned. A working fluid in the above range is a working fluid of which self-decomposition reaction of HFO-1123 is suppressed, and which has high durability, in addition to the above effects increased. From the viewpoint of the relative coefficient of performance, the content of HFC-32 is more preferably at least 5 mass %, more preferably at least 8 mass %.

Further, in another preferred composition in a case where the working fluid in the present invention contains HFO-1123, HFO-1234yf and HFC-32, the content of HFO-1123 based on the entire amount of the working fluid is at most 70 mol %. Within such a range, self-decomposition reaction of HFO-1123 is suppressed, and a working fluid having high durability can be obtained.

A more preferred composition range (R) will be described below.

<Composition Range (R)>
  10 mass %≤HFO-1123<70 mass %
  0 mass %<HFO-1234yf≤50 mass %
  30 mass %<HFC-32≤75 mass %

The working fluid in the above composition is a working fluid having respective characteristics of HFO-1123, HFO-1234yf and HFC-32 in a balanced manner, and having defects of the respective components suppressed. That is, it is a working fluid which has a low GWP, which has durability secured, and which has a small temperature glide and has high performance and efficiency when used for heat cycle, and thus with such a working fluid, favorable cycle performance will be obtained.

A more preferred composition range of the working fluid of the present invention in the composition range (R) will be described below.

20 mass %≤HFO-1123<70 mass %
  0 mass %<HFO-1234yf≤40 mass %
  30 mass %<HFC-32≤75 mass %

The working fluid in the above composition is a working fluid having respective characteristics of HFO-1123, HFO-1234yf and HFC-32 in a balanced manner, and having defects of the respective components suppressed. That is, it is a working fluid which has a low GWP, which has durability secured, and which has a smaller temperature glide and has higher performance and efficiency when used for heat cycle, and thus with such a working fluid, favorable cycle performance will be obtained.

Another more preferred composition range (L) of the working fluid of the present invention in the above composition range (R) will be described below. A composition range (M) is furthermore preferred.

<Composition Range (L)>
  10 mass %≤HFO-1123<70 mass %
  0 mass %<HFO-1234yf≤50 mass %
  30 mass %<HFC-32≤44 mass %

<Composition Range (M)>
  20 mass %≤HFO-1123<70 mass %
  5 mass %≤HFO-1234yf≤40 mass %
  30 mass %<HFC-32≤44 mass %

A working fluid in the above composition range (M) is a working fluid having respective characteristics of HFO-1123, HFO-1234yf and HFC-32 in a balanced manner, and having defects of the respective components suppressed. That is, such a working fluid is a working fluid of which the upper limit of GWP is suppressed to be so low as at most 300, which has durability secured, and which has a small temperature glide of less than 5.8 and has a relative coefficient of performance and a relative refrigerating capacity close to 1, when used for heat cycle, and thus with such a working fluid, favorable cycle performance will be obtained.

Within such a range, the upper limit of the temperature glide is lowered, and the lower limit of the product of the relative coefficient of performance and the relative refrigerating capacity is increased. In view of a high relative coefficient of performance, more preferably 8 mass %≤HFO-1234yf. Further, in view of a high relative refrigerating capacity, more preferably HFO-1234yf≤35 mass %.

Another preferred composition range (Q) in a case where the working fluid in the present invention contains HFO-1123, HFO-1234ze(E) and HFC-32 will be described below.

In the respective formulae illustrating the composition range (Q), the abbreviated names of the compounds represent the proportions (mass %) of the compounds based on the total amount of HFO-1123, HFO-1234ze(E) and HFC-32. The same applies to the composition ranges (S), (K) and (N).

<Composition Range (Q)>
  70 mass %≤HFO-1123+HFO-1234ze(E)
  30 mass %≤HFO-1123≤80 mass %
  HFO-1234ze(E)≤40 mass %
  0 mass %<HFC-32≤30 mass %
  HFO-1123/HFO-1234ze(E)≤95/5 mass %

The working fluid in the above composition is a working fluid having respective characteristics of HFO-1123, HFO-1234ze(E) and HFC-32 in a balanced manner, and having defects of the respective components suppressed. That is, the working fluid is a working fluid which has a very low GWP, has a small temperature glide and has a certain performance and efficiency when used for heat cycle, and thus with such a working fluid, favorable cycle performance will be obtained.

As a more preferred composition of the working fluid in the present invention, a composition containing HFO-1123 in a proportion of from 30 to 70 mass %, HFO-1234ze(E) in a proportion of from 4 to 40 mass % and HFC-32 in a proportion of from 0 to 30 mass % based on the total amount of HFO-1123, HFO-1234ze(E) and HFC-32, and having a content of HFO-1123 being at most 70 mol % based on the entire amount of the working fluid, may be mentioned. A working fluid in the above range is a working fluid of which self-decomposition reaction of HFO-1123 is suppressed, and which has high durability, in addition to the above effects increased. From the viewpoint of the relative coefficient of performance, the content of HFC-32 is preferably at least 5 mass %, more preferably at least 8 mass %.

Further, in another preferred composition in a case where the working fluid in the present invention contains HFO-1123, HFO-1234ze(E) and HFC-32, the content of HFO-1123 based on the entire amount of the working fluid is at most 70 mol %. Within such a range, self-decomposition reaction of HFO-1123 is suppressed, and a working fluid having high durability can be obtained.

A more preferred composition range (S) will be described below.

<Composition Range (S)>
10 mass %≤HFO-1123<70 mass %
0 mass %<HFO-1234ze(E)≤50 mass %
30 mass %<HFC-32≤75 mass %

The working fluid in the above composition is a working fluid having respective characteristics of HFO-1123, HFO-1234ze(E) and HFC-32 in a balanced manner, and having defects of the respective components suppressed. That is, it is a working fluid which has a low GWP, which has durability secured, and which has a small temperature glide and has high performance and efficiency when used for heat cycle, and thus with such a working fluid, favorable cycle performance will be obtained.

A more preferred range of the working fluid of the present invention in the composition range (S) will be described below.

20 mass %≤HFO-1123<70 mass %
0 mass %<HFO-1234ze(E)≤40 mass %
30 mass %<HFC-32≤75 mass %

The working fluid in the above composition is a working fluid having respective characteristics of HFO-1123, HFO-1234ze(E) and HFC-32 in a balanced manner, and having defects of the respective components suppressed. That is, it is a working fluid which has a low GWP, which has durability secured, and which has a smaller temperature glide and has higher performance and efficiency when used for heat cycle, and thus with such a working fluid, favorable cycle performance will be obtained.

Another more preferred composition range (K) of the working fluid of the present invention in the above composition range (S) will be described below. A composition range (N) is further preferred.

<Composition Range (K)>
10 mass %≤HFO-1123<70 mass %
0 mass %<HFO-1234ze(E)≤50 mass %
30 mass %<HFC-32≤44 mass %

<Composition Range (N)>
20 mass %≤HFO-1123<70 mass %
5 mass %≤HFO-1234ze(E)≤40 mass %
30 mass %<HFC-32≤44 mass %

The working fluid in the above composition range (N) is a working fluid having respective characteristics of HFO-1123, HFO-1234ze(E) and HFC-32 in a balanced manner, and having defects of the respective components suppressed. That is, such a working fluid is a working fluid of which the upper limit of GWP is suppressed to be so low as at most 300, which has durability secured, and which has a small temperature glide of less than 5.8 and has a relative coefficient of performance and a relative refrigerating capacity close to 1, when used for heat cycle, and thus with such a working fluid, favorable cycle performance will be obtained.

Within such a range, the upper limit of the temperature glide is lowered, and the lower limit of the product of the relative coefficient of performance and the relative refrigerating capacity is increased. In view of a high relative coefficient of performance, more preferably 8 mass %≤HFO-1234ze(E). Further, in view of a high relative refrigerating capacity, more preferably HFO-1234ze(E)≤35 mass %.

<Other Components>

The working fluid of the present invention may contain other components in addition to HFO-1123, HFC-32, HFO-1234yf and HFO-1234ze(E). The total content of such other components is preferably less than 1.5 mass %, more preferably at most 1.4 mass %, based on the entire amount of the working fluid of 100 mass %.

Such other components are impurities (including impurities in the materials, intermediate products, by-products, etc., the same applies hereinafter) contained in a composition (for example, an outlet gas from a reactor, the same applies hereinafter) formed in production of HFO-1123, impurities contained in a composition formed in production of HFC-32, impurities contained in a composition formed in production of HFO-1234yf, and impurities contained in a composition formed in production of HFO-1234ze(E).

Of such other components, abbreviated names, chemical formulae and names of compounds are shown in Tables 1 and 2. In Tables 1 and 2, abbreviate names, chemical formulae and names of HFO-1123, difluoroethylene (HFO-1132a and HFO-1132), HFC-32, HFO-1234yf and HFO-1234ze(E) are also shown.

TABLE 1

| Abbreviated names | Chemical formulae | Compound names |
|---|---|---|
| | $CH_4$ | Methane |
| | $CH_3CH_3$ | Ethane |
| | $CH_3CH_2CH_3$ | Propane |
| | $CH_3CH_2CH_2CH_3$ | Butane |
| | $CH_3CH(CH_3)CH_3$ | Isobutane |
| HCC-40 | $CH_3Cl$ | Chloromethane |
| HCC-30 | $CH_2Cl_2$ | Dichloromethane |
| CFC-12 | $CF_2Cl_2$ | Dichlorodifluoromethane |
| HCFC-22 | $CHF_2Cl$ | Chlorodifluoromethane |
| HFC-23 | $CHF_3$ | Trifluoromethane |
| HFC-32 | $CH_2F_2$ | Difluoromethane |
| HCFC-31 | $CH_2FCl$ | Chlorofluoromethane |
| HFC-41 | $CH_3F$ | Fluoromethane |
| CFC-113 | $CCl_2FCF_2Cl$ | 1,1,2-trichloro-1,2,2-trifluoroethane |
| HCFC-123a | $CF_2ClCHFCl$ | 1,2-dichloro-1,1,2-trifluoroethane |
| HCFC-124 | $CHFClCF_3$ | 1-chloro-1,2,2,2-tetrafluoroethane |
| HCFC-124a | $CF_2ClCHF_2$ | 1-chloro-1,1,2,2-tetrafluoroethane |
| HFC-125 | $CHF_2CF_3$ | Pentafluoroethane |
| HCFC-133 | $CHFClCHF_2$ | 1-chloro-1,2,2-trifluoroethane |

TABLE 1-continued

| Abbreviated names | Chemical formulae | Compound names |
|---|---|---|
| HCFC-133b | $CF_2ClCH_2F$ | 1-chloro-1,1,2-trifluoroethane |
| HFC-134 | $CHF_2CHF_2$ | 1,1,2,2-tetrafluoroethane |
| HFC-134a | $CF_3CH_2F$ | 1,1,1,2-tetrafluoroethane |
| HCFC-142 | $CH_2ClCHF_2$ | 2-chloro-1,1-difluoroethane |
| HCFC-142b | $CF_2ClCH_3$ | 1-chloro-1,1-difluoroethane |
| HFC-143 | $CHF_2CH_2F$ | 1,1,2-trifluoroethane |
| HFC-143a | $CF_3CH_3$ | 1,1,1-trifluoroethane |
| HFC-152a | $CHF_2CH_3$ | 1,1-difluoroethane |
| HCFC-225aa | $CHF_2CCl_2CF_3$ | 2,2-dichloro-1,1,3,3,3-pentafluoropropane |
| HCFC-225ca | $CF_3CF_2CHCl_2$ | 3,3-dichloro-1,1,1,2,2-pentafluoropropane |
| HCFC-225cb | $CClF_2CFl_2CHClF$ | 1,3-dichloro-1,1,2,2,3-pentafluoropropane |
| HFC-227ca | $CF_3CF_2CHF_2$ | 1,1,1,2,2,3,3-heptafluoropropane |
| HFC-227ea | $CF_3CHFCF_3$ | 1,1,1,2,3,3,3-heptafluoropropane |
| HFC-236fa | $CF_3CH_2CF_3$ | 1,1,1,3,3,3-hexafluoropropane |
| HFC-236ea | $CF_3CHFCHF_2$ | 1,1,1,2,3,3-hexafluoropropane |
| HCFC-244bb | $CF_3CClFCH_3$ | 2-chloro-1,1,1,2-tetrafluoropropane |
| HCFC-244fa | $CF_3CH_2CHClF$ | 3-chloro-1,1,1,3-tetrafluoropropane |
| HFC-245cb | $CF_3CF_2CH_3$ | 1,1,1,2,2-pentafluoropropane |
| HFC-245eb | $CF_3CHFCH_2F$ | 1,1,1,2,3-pentafluoropropane |
| HFC-245fa | $CF_3CH_2CHF_2$ | 1,1,1,3,3-pentafluoropropane |
| HFC-254eb | $CF_3CHFCH_3$ | 1,1,1,2-tetrafluoropropane |
|  | $CCl_3CH_2CHCl_2$ | 1,1,1,3,3-pentachloropropane |

TABLE 2

| Abbreviated names | Chemical formulae | Compound names |
|---|---|---|
|  | $CH_2=CH_2$ | Ethylene |
|  | $CH_2CH=CH_2$ | Propylene |
|  | $CH_2=CHCH_2CH_3$ | 1-n-butene |
|  | $CH_3CH=CHCH_3$ | 2-n-butene |
|  | $CH_2=C(CH_3)_2$ | Isobutene |
| CFO-1112 | $CFCl=CFCl$ | E- and/or Z-1,2-dichloro-1,2-difluoroethylene |
| CFO-1113 | $CF_2=CFCl$ | Chlorotrifluoroethylene (CTFE) |
| FO-1114 | $CF_2=CF_2$ | Tetrafluoroethylene (TFE) |
| HCFO-1122 | $CF_2=CHCl$ | 1-chloro-2,2-difluoroethylene |
| HCFO-1122a | $CFCl=CHCl$ | E- and/or Z-1,2-dichlorofluoroethylene |
| HFO-1123 | $CF_2=CHF$ | Trifluoroethylene |
| HCFO-1131 | $CHF=CHCl$ | E- and/or Z-1-chloro-2-fluoroethylene |
| HFO-1132 | $CHF=CHF$ | E- and/or Z-1,2-difluoroethylene |
| HFO-1132a | $CF_2=CH_2$ | 1,1-difluoroethylene (VdF) |
| HFO-1141 | $CHF=CH_2$ | Fluoroethylene |
| CFO-1214ya | $CF_3CF=CCl_2$ | 1,1-dichloro-3,3,3,2-tetrafluoropropene |
| FO-1216 | $CF_3CF=CF_2$ | Hexafluoropropene |
| HCFO-1224yd | $CF_3CF=CHCl$ | 1-chloro-2,3,3,3-tetrafluoropropene |
| HFO-1225zc | $CF_3CH=CF_2$ | 1,1,3,3,3-pentafluoropropene |
| HFO-1225ye | $CF_3CF=CHF$ | 1,2,3,3,3-pentafluoropropene |
| HCFO-1233xf | $CF_3CCl=CH_2$ | 2-chloro-3,3,3-trifluoropropene |
| HCFO-1233zd | $CF_3CH=CHCl$ | E- and/or Z-1-chloro-3,3,3-trifluoropropene |
| HFO-1234yf | $CF_3CF=CH_2$ | 2,3,3,3-tetrafluoropropene |
| HFO-1234ze | $CF_3CH=CHF$ | E- and/or Z-1,3,3,3-tetrafluoropropene |
| HFO-1243zf | $CF_3CH=CH_2$ | 3,3,3-trifluoropropene |
| HFO-1252zf | $CHF_2CH=CH_2$ | 3,3-difluoropropene |
| RC318 | $-(CF_2CF_2CF_2CF_2)-$ | Perfluorocyclobutane |

Now, processes for producing HFO-1123, HFC-32, HFO-1234yf and HFO-1234ze(E) and impurities contained in compositions obtained in their production will be described.

<Production of HFO-1123>

As a process for producing HFO-1123, for example, three processes of (I) hydrogen reduction of chlorotrifluoroethylene (CTFE) (CFO-1113), (II) synthesis involving heat decomposition of chlorodifluoromethane (HCFC-22) and chlorofluoromethane (HCFC-31) and (III) catalytic reaction of 1,1,1,2-tetrafluoroethane (HFC-134a) and a solid reactant may be mentioned.

(I) Hydrogen Reduction of CFO-1113

CFO-1113 and hydrogen are reacted in a gaseous phase in a reactor having a catalyst layer packed with a catalyst-supporting carrier to form a gas containing HFO-1123.

In this process, a reaction represented by the following reaction formula is carried out in the reactor.

With respect to the ratio of CFO-1113 and hydrogen in a material composition, the proportion of hydrogen is within a range of from 0.01 to 4.0 mol per 1 mol of CFO-1113. The pressure in the reactor is preferably ordinary pressure in view of the handling efficiency. The catalyst is preferably a palladium catalyst, and the palladium catalyst is supported on a carrier such as activated carbon. In order to carry out gaseous phase reaction, the temperature of the catalyst layer is a temperature of at least the dew point of the material composition (gas mixture) containing CFO-1113 and hydrogen. It is preferably within a range of from 220° C. to 240° C. The time of contact of CFO-1113 as the material compound and the catalyst is preferably from 4 to 60 seconds.

In such hydrogen reduction of CFO-1113, a composition containing HFO-1123 can be obtained as an outlet gas of the reactor. Compounds other than HFO-1123 contained in the outlet gas may, for example, be CFO-1113 as the unreacted material, and HFO-1132, HFO-1132a, HCFO-1122, HCFO-1122a, HFC-143, methane, HFC-152a, HCFC-142, HCFC-142b, HCFC-133, HCFC-133b, HCFC-123a, CFC-113 and CFO-1112.

(II) Synthesis Involving Heat Decomposition of HCFC-22 and HCFC-31

HFO-1123 is produced by a synthetic reaction involving heat decomposition using a material composition containing HCFC-22 and HCFC-31 in the presence of a heating fluid.

In this production process, HCFC-22 and HCFC-31 in a molar ratio of 1:0.01 to 4.0 are supplied to a reactor as preliminarily mixed or separately and allowed to stay in the reactor, and the heating fluid is supplied to the reactor and brought into contact with the material composition in the reactor. The temperature in the reactor is preferably from 400 to 1,200° C.

The main reaction in the reactor in this production process is shown in the following formula:

The material composition may be introduced into the reactor at ordinary temperature or may be preliminarily heated and then introduced to the reactor so as to increase the reactivity in the reactor. The temperature of HCFC-31 to be supplied to the reactor is preferably from 0 to 600° C., and the temperature of HCFC-22 is preferably at least ordinary temperature (25° C.) and at most 600° C.

The heating fluid is a medium which does not undergo heat decomposition at the temperature in the reactor, and is preferably a gas containing water vapor in an amount of at least 50 vol % and containing nitrogen and/or carbon dioxide as the rest. The amount of supply of the heating fluid is preferably from 20 to 98 vol % based on the total amount of the heating fluid and the material composition supplied. The time of contact of the heating fluid and the material composition in the reactor is preferably from 0.01 to 10 seconds, and the pressure in the reactor is preferably from 0 to 2.0 MPa by the gauge pressure.

By such synthesis involving heat decomposition of HCFC-22 and HCFC-31, a composition containing HFO-1123 can be obtained as an outlet gas of the reactor. Compounds other than HFO-1123 contained in the outlet gas may, for example, be HCFC-22 and HCFC-31 as the unreacted materials, and HFO-1132, HFO-1132a, HFO-1141, CFO-1113, HCFO-1122, HCFO-1122a, HFC-143, FO-1114, HCFO-1131, HFO-1252zf, HFO-1243zf, HFO-1234yf, HFO-1234ze, FO-1216, HFC-125, HFC-134, HFC-134a, HFC-143a, HCFC-124, HCFC-124a, HFC-227ca, HFC-227ea, HFC-236fa, HFC-236ea, CFC-12, HFC-23, HFC-32, HFC-41, HCC-40, RC-318 and methane.

(III) Catalytic Reaction of HFC-134a and Solid Reactant

A material gas containing HFC-134a and a solid reactant are brought into contact and reacted with each other in a reactor to form a composition (gas) containing HFO-1123. The solid reactant may, for example, be calcium oxide in the form of particles.

The main reaction in the reactor in this process is shown in the following formula:

The content of HFC-134a in the material gas (100 mol %) is preferably from 5 to 100 mol %. Further, the temperature in the reactor is preferably from 200 to 500° C., and the pressure is preferably from 0 to 2 MPa by the gauge pressure.

Further, particularly, a solid reactant (for example, potassium carbonate and/or calcium oxide) in the form of particles having a predetermined average particle size (1 μm to 5,000 μm) may be used, a material gas containing HFC-134a is made to flow through a layer of the solid reactant to bring HFC-134a into contact with the solid reactant in a state where the solid reactant layer is fluidized. In this embodiment, the temperature at which HFC-134a is contacted with the solid reactant is preferably within a range of from 100° C. to 500° C.

In such catalytic reaction of HFC-134a and the solid reactant, a composition containing HFO-1123 may be obtained as an outlet gas of the reactor. Compounds other than HFO-1123 and the unreacted material component (HFC-134a) contained in the outlet gas may, for example, be hydrogen fluoride, E/Z-HFO-1132, HFO-1132a, HFC-143, HFC-143a, methane, ethane, ethylene, propane, propylene, butane, isobutane, 1-n-butene, 2-n-butene, isobutene, HFO-1141, HFO-1252zf, HFO-1243zf, HFO-1234yf, E/Z-HFO-1234ze, FO-1216, HFC-125, HFC-134, HFC-143a, HFC-227ca, HFC-227ea, HFC-236fa, HFC-236ea, HFC-32, HFC-23 and HFC-41.

As described above, in the respective processes for producing HFO-1123, in addition to HFO-1123, the above difluoroethylene compound (HFO-132a and/or HFO-132) and various compounds are present as impurities in a formed composition such as an outlet gas from the reactor. Compounds other than the difluoroethylene compound, HFC-32 and HFO-1234yf in the impurities are the above-mentioned impurities contained in a composition formed in production of HFO-1123.

<Production of HFC-32>

As a process for producing HFC-32, a process of subjecting dichloromethane (HCC-30) and hydrogen fluoride to a gaseous phase reaction at a temperature of from 200 to 500° C. using an aluminum fluoride catalyst, a catalyst formed by mixing and forming aluminum fluoride with a carrier, or a catalyst having chromium fluoride supported on a carrier, may be mentioned. By this process, an outlet gas of the reactor contains the desired HFO-32 and HFC-31 as well, and further contains the unreacted HCC-30.

Further, as another process for producing HFC-32, a process of reacting HCC-30 and hydrogen fluoride in a liquid phase in the presence of a fluorinated catalyst such as a mixture of antimony pentafluoride and antimony trifluoride, or antimony pentafluoride at a predetermined concentration (at a temperature of from 80 to 150° C., under a pressure of from 8 to 80 kg/cm$^2$) may be mentioned. By this process, HFC-31, HFC-23 and HCC-40 will form as impurities, in addition to HFC-32.

As mentioned above, in the respective processes for producing HFC-32, HCC-30, HFC-31, HFC-23 and HCC-40 will form as impurities. Such impurities are the above-mentioned impurities contained in a composition formed in production of HFC-32.

<Production of HFO-1234yf>

As a process for producing HFO-1234yf, (i) a process of using an isomeric mixture of (i) dichloropentafluoropropane (HCFC-225) (225 process), (ii) a process of using hexafluoropropene (FO-1216) as a material compound (HFP process), (iii) a process of using 1,1,2,3-tetrachloropropene (HCC-1230) as a starting material (TCP process) and (iv) a process of subjecting a material composition to a synthesis reaction involving heat decomposition in the presence of a heating fluid may, for example, be mentioned.

(i) 225 Process

HFO-1234yf is produced using an isomeric mixture of HCFC-225. In this process, as shown in the following reaction path, 1,1-dichloro-2,2,3,3,3-pentafluoropropane (HCFC-225ca) in the material is selectively subjected to dehydrofluorination to produce 1,1-dichloro-2,3,3,3-tetrafluoropropene (CFO-1214ya), and the obtained CFO-1214ya is reduced to produce HFO-1234yf.

In this production process, as impurities obtained in addition to HFO-1234yf, the following compounds may be mentioned. That is, as impurities contained in the material, HCFC-225ca, and its isomers HCFC-225cb and HCFC-225aa may, for example, be mentioned. Further, intermediate products CFO-1214ya and HCFO-1224yd may, for example, be mentioned. Further, as by-products, HFC-254eb which is a reduced form of HCFC-225ca, HFO-1225zc obtained by dehydrochlorination and then reduction of HCFC-225aa, HFO-1243zf which is an over-reduced form of HFO-1234yf, and HFO-1252zf may, for example, be mentioned.

(ii) HFP Process

HFO-1234yf is produced using FO-1216 (PFO-1216yc) as a material compound in accordance with the following reaction path:

In this production process, as impurities obtained in addition to HFO-1234yf, FO-1216, HFO-1225ye and HFO-1234ze may, for example, be mentioned.

Further, HFO-1234yf may be produced using 1,2,3-trichloropropane as a material compound in accordance with the following reaction path. In this production process, HFC-245cb is an organic impurity.

(iii) TCP Process

HFO-1234yf is produced using HCC-1230 as a starting material. That is, in accordance with the following reaction path, HCC-1230 is fluorinated with hydrogen fluoride to form 2-chloro-3,3,3-trifluoropropene (HCFO-1233xf), then HCFO-1233xf is reacted with hydrogen fluoride to form 2-chloro-1,1,1,2-tetrafluoropropane (HCFC-244bb), and further HCFC-244bb is subjected to dehydrohalogenation to form HFO-1234yf.

In this production process, HCFO-1233xf, HCFC-244bb, HFO-1234ze, HFO-1243zf, 1,1,1,2,3-pentafluoropropane (HFC-245eb) and the like form as impurities.

(iv) Synthesis Involving Heat Decomposition

HFO-1234yf is produced by a synthetic reaction involving heat decomposition from a material composition in the presence of a heating fluid. As the heating fluid, water vapor, nitrogen, carbon dioxide or the like is used. Preferred is a gas containing water vapor in an amount of at least 50 vol % and containing nitrogen and/or carbon dioxide as the rest.

As the material composition, a compound which may be decomposed by contact with the heating fluid in a reactor to form difluorocarbene ($F_2C$:) and chloromethane or methane are used as mixed.

Specifically, a material composition containing compounds of the following (iv-1) to (iv-6) is used. And, compounds shown in each section, in addition to HFO-1234yf and the unreacted material components, are obtained as components (impurities) of an outlet gas from the reactor.

(iv-1) HCFC-22 and HCC-40

HCFC-22 and HCC-40 are supplied to a reactor as mixed in a predetermined ratio or separately, and further, the heating fluid is supplied to the reactor and brought into contact with the material composition containing HCFC-22 and HCC-40 in the reactor to carry out a synthetic reaction involving heat decomposition thereby to form HFO-1234yf and HFO-1132a. The temperature in the reactor is from 400 to 1,200° C. The main reaction in the reactor is shown in the following formula:

Compounds other than HFO-1234yf, HFO-1132a and the unreacted material components contained in the outlet gas of the reactor may, for example, be methane, ethylene, FO-1114, FO-1216, CFO-1113, HFO-1123, RC-318, HFO-1234ze) and HFO-1132.

(iv-2) HCFC-22, HCC-40 and FO-1114

HCFC-22, HCC-40 and FO-1114 are supplied to a reactor as preliminarily mixed or separately and allowed to stay in the reactor for a predetermined time, the heating fluid is supplied to the reactor and brought into contact with the material composition in the reactor. And, by a synthetic reaction involving heat decomposition, HFO-1234yf and HFO-1132a are formed. The temperature in the reactor is from 400 to 1,200° C. The main reaction in the reactor is shown in the following formula.

Compounds other than HFO-1234yf, HFO-1132a and the unreacted material components contained in an outlet gas of the reactor, may, for example, be methane, ethylene, FO-1114, FO-1216, CFO-1113, HFO-1123, RC318 and HFO-1243zf.

(iv-3) R318 and HCC-40

HFO-1234yf and HFO-1132a are produced by a synthetic reaction involving heat decomposition from a material composition containing R318 and HCC-40 in the presence of a heating fluid. Compounds other than HFO-1234yf, HFO-1132a and the unreacted material components contained in an outlet gas of the reactor may, for example, be methane, ethylene, HFC-22, FO-1114, FO-1216, CFO-1113, HFO-1123, HFO-1234ze and HFO-1132.

(iv-4) FO-1216 and HCC-40

HFO-1234yf and HFO-1132a are produced by a synthetic reaction involving heat decomposition from a material composition containing FO-1216 and HCC-40 in the presence of a heating fluid. Compounds other than HFO-1234yf, HFO-1132a and the unreacted material components contained in an outlet gas of the reactor may, for example, be methane, ethylene, HFC-22, HFC-23, FO-1114, FO-1216, CFO-1113, RC318, HFO-1123, HFO-1234ze and HFO-1132.

(iv-5) HFC-22 and/or FO-1114 and Methane

HFO-1234yf and HFO-1132a are produced by a synthetic reaction involving heat decomposition from a material composition containing HFC-22 and/or FO-1114 and methane in the presence of a heating fluid. Compounds other than HFO-1234yf, HFO-1132a and the unreacted material components contained in an outlet gas of the reactor, may, for example, be methane, ethylene, FO-1114, FO-1216, CFO-1113, RC318, HFO-1123 and HFO-1243zf.

(iv-6) FO-1114 and HCC-40

HFO-1234yf is produced by a synthetic reaction involving heat decomposition from a material composition containing FO-1114 and HCC-40 in the presence of a heating fluid. The temperature in the reactor to which the material composition and the heating fluid are supplied is from 400 to 870° C. Compounds other than HFO-1234yf and the unreacted material components contained in an outlet gas of the reactor may, for example, be methane, ethylene, FO-1216, CFO-1113, RC318, HFO-1132a, HFO-1123 and HFO-1243zf.

<Production of HFO-1234ze(E)>

As a process for producing HFO-1234ze(E), (i) a process of fluorinating 1-chloro-3,3,3-trifluoropropene (HCFO-1233zd) and (ii) a process of subjecting HFC-245fa to dehydrofluorination may, for example, be mentioned.

(i) A Process of Fluorinating HFO-1233zd

HFO-1234ze(E) is produced by using HCFO-1233zd. In this process, as shown in the following reaction path, 1,1,1,3,3-pentachloropropane is reacted with hydrogen fluoride to obtain HCFO-1233zd, which is fluorinated by being reacted with hydrogen fluoride in a gaseous phase in the presence of a fluorination catalyst to produce HFO-1234ze (E).

Otherwise, as shown in the following reaction path, HCFO-1233zd as the material is reacted with hydrogen fluoride to form intermediate products including 3-chloro-1,1,1,3-tetrafluoropropane (HCFC-244fa) and 1,1,1,3,3-pentafluoropropane (HFC-245fa), and the intermediate products are reacted with a caustic solution to conduct dehydrochlorination of HCFC-244fa and dehydrofluorination of HFC-245fa thereby to produce HFO-1234ze(E).

In the production process, as impurities obtained together with HFO-1234ze(E), the following compounds may be mentioned. That is, as impurities contained in the material, HCFO-1233zd, and 1,1,1,3,3-pentachloropropane as the material of HCFO-1233zd may, for example, be mentioned, and intermediate products HCFC-244fa and HFC-245fa may, for example, be mentioned as by-products. Further, HFO-1234ze(Z) which is an isomer of HFO-1234ze(E), HCl and HF may, for example, be mentioned.

(ii) Process of Dehydrofluorination of HFC-245fa

HFO-1234ze(E) is produced by using HFC-245fa. In this process, HFC-245fa as the material is brought into contact with a catalyst or is reacted with a caustic solution at high temperature, in a gaseous phase, to conduct dehydrofluorination of HFC-245fa thereby to produce HFO-1234ze(E).

In this production process, as impurities obtained together with HFO-1234ze(E), the following compounds may be mentioned. That is, as impurities contained in the material, HFC-245fa may, for example, be mentioned, and as by-products, HFO-1234ze(Z) which is an isomer of HFO-1234ze(E), and HF, may, for example, be mentioned.

Here, the boiling point of HFO-1234ze(E) is about −19° C., the boiling point of HFC-245fa is about 15° C., and the boiling point of HFO-1234ze(Z) is about 9° C., and they can be separated e.g. by distillation.

As described above, the working fluid of the present invention, which may contain other components, is produced with high productivity as a working fluid.

The working fluid of the present invention has less influence over the ozone layer, has less influence over global warming, and is excellent in cycle performance, and is thereby useful as a working fluid for a heat cycle system. The heat cycle system may, for example, be specifically a refrigerating apparatus, an air-conditioning apparatus, a power generation system, a heat transfer apparatus and a secondary cooling machine.

The air-conditioning apparatus may, for example, be specifically a room air-conditioner, a package air-conditioner (such as a store package air-conditioner, a building package air-conditioner or a plant package air-condition), a gas engine heat pump, a train air-conditioning system or an automobile air-conditioning system.

The refrigerating apparatus may, for example, be specifically a showcase (such as a built-in showcase or a separate showcase), an industrial fridge freezer, a vending machine or an ice making machine.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

The heat transport apparatus is preferably a latent heat transport apparatus. The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

EXAMPLES

Now, the present invention will be described in further detail with reference to Examples. However, it should be understood that the present invention is by no means restricted to such specific Examples. Odd-numbered Ex. among Ex. 1 to 3 and 5 to 163 are Examples of the present invention, and even-numbered Ex. among Ex. 4 to 164 are Comparative Examples.

Ex. 1 to 164

A working fluid containing HFO-1123, HFC-32 and/or HFO-1234yf, and HFO-1234ze(E) in a proportion as identified in Tables 3 to 7 and containing HFO-1132a in a proportion as identified in Table 3 based on the working fluid, was prepared. Of the working fluid, refrigerating cycle performance (hereinafter referred to as refrigerating capacity Q) was measured by the following method.

The refrigerating capacity Q means a capacity to refrigerate a load fluid, and a larger Q means that more works can be done in the same system. In other words, it means that with a working fluid having a larger Q, the desired performance can be obtained with a smaller amount, whereby the system can be downsized.

[Measurement of the Refrigerating Capacity Q]

Figure 1:
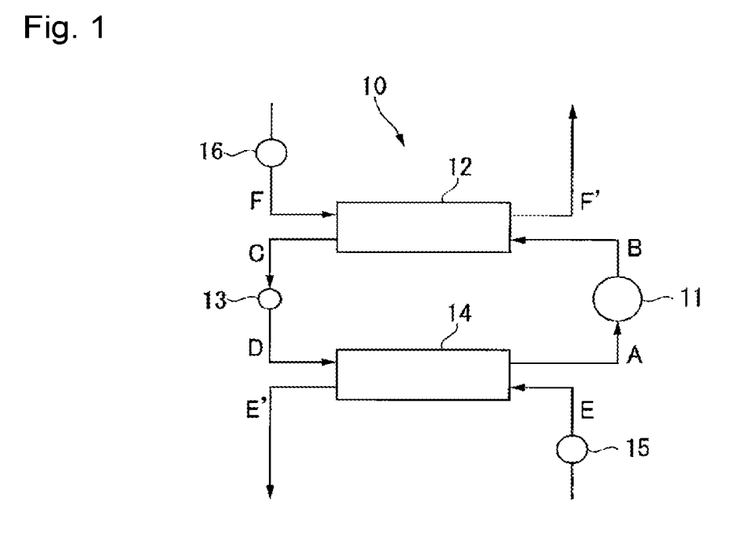
FIG. 1 is a schematic construction view illustrating a refrigerating cycle system used to measure cycle performance of a working fluid in Examples of the present invention.
Figure 2:
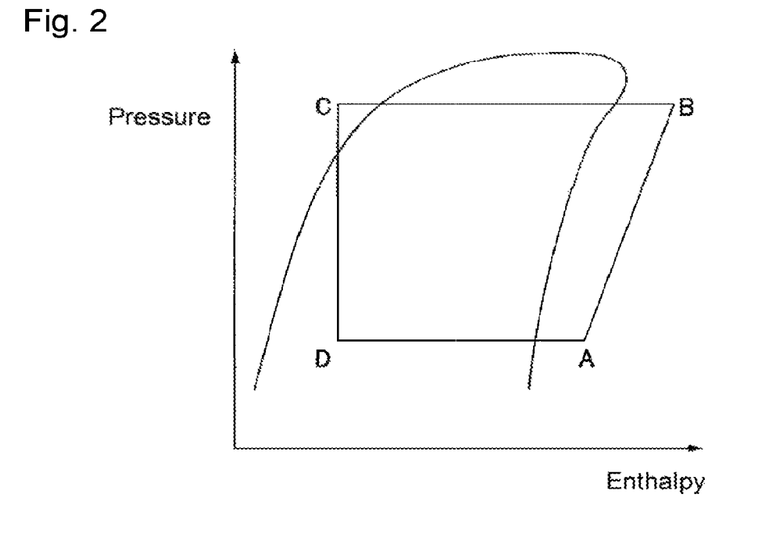
FIG. 2 is a cycle diagram illustrating the state change of a working fluid in the refrigerating cycle system in FIG. 1 on a pressure-enthalpy chart.

Measurement of the refrigerating capacity Q was carried out with respect to a case where a working fluid was applied to a refrigerating cycle system 10 as shown in FIG. 1 and a heat cycle shown in FIG. 2, i.e. adiabatic compression by a compressor 11 in the AB process, isobaric cooling by a condenser 12 in the BC process, isenthalpic expansion by an expansion valve 13 in the CD process and isobaric heating by an evaporator 14 by the DA process were carried out.

The refrigerating cycle system 10 shown in FIG. 1 comprises a compressor 11 to compress a working fluid (vapor), a condenser 12 to cool and liquefy the working fluid vapor discharged from the compressor 11, an expansion valve 13 to let the working fluid (liquid) discharged from the condenser 12 expand, and an evaporator 14 to heat and vaporize the working fluid liquid discharged from the expansion valve 13. In this refrigerating cycle system 10, the temperature of the working fluid increases from an inlet toward an outlet of the evaporator 14 at the time of evaporation, and on the contrary, the temperature of the working fluid decreases from an inlet toward an outlet of the condenser 12 at the time of condensation. In the refrigerating cycle system 10, in the evaporator 14 and the condenser 12, such is achieved by heat exchange between the working fluid and a heat source fluid such as water or the air flowing to face the working fluid. The heat source fluid is represented, in the refrigerating cycle system 10, by "E→E'" in the evaporator 14 and by "F→F'" in the condenser 12.

As the measurement conditions, the average evaporation temperature of the working fluid in the evaporator 14 was 0° C., the average condensing temperature of the working fluid in the condenser 12 was 40° C., the supercooling degree (SC) of the working fluid in the condenser 12 was 5° C., and the degree of superheat (SH) of the working fluid in the evaporator 14 was 5° C.

In the evaporator, a fluorinated brine (ASAHIKLIN AE-3000: manufactured by Asahi Glass Company, Limited) was used as the heat source fluid, and from the temperature and the flow amount of the heat source fluid before and after heat exchange in the evaporator 14, the refrigerating capacity Q of the working fluid was obtained.

The results of evaluation of the refrigerating capacity Q are shown in Tables 3 to 7, based on evaluation standards ⊚ (excellent): the relative capacity of 1 or higher based on the refrigerating capacity Q of 1 at a content of HFO-1132a of 0 ppm in each working fluid composition, ○ (good): from 0.9 to less than 1, Δ (fair): from 0.7 to less than 0.9, and X (poor): less than 0.7.

TABLE 3

| | Component | HFO-1123 | HFC-32 | HFO-1234yf | HFO-1234ze(E) | Proportion of HFO-1132a based on working fluid (mass %) | Refrigerating capacity |
|---|---|---|---|---|---|---|---|
| | | | | | | | |
| Ex. 1 | HFO-1123/HFC-32/HFO-1132a | 59.9 | 40 | 0 | 0 | 0.1 | ⊚ |
| Ex. 2 | HFO-1123/HFC-32/HFO-1132a | 59.5 | 40 | 0 | 0 | 0.5 | ○ |
| Ex. 3 | HFO-1123/HFC-32/HFO-1132a | 59 | 40 | 0 | 0 | 1 | Δ |
| Ex. 4 | HFO-1123/HFC-32/HFO-1132a | At most 58.5 | 40 | 0 | 0 | At least 1.5 | X |
| Ex. 5 | HFO-1123/HFC-32/HFO-1132a | 39.5 | 60 | 0 | 0 | 0.5 | ○ |
| Ex. 6 | HFO-1123/HFC-32/HFO-1132a | At most 38.5 | 60 | 0 | 0 | At least 1.5 | X |
| Ex. 7 | HFO-1123/HFO-1234yf/HFO-1132a | 59.5 | 0 | 40 | 0 | 0.5 | ○ |
| Ex. 8 | HFO-1123/HFO-1234yf/HFO-1132a | At most 58.5 | 0 | 40 | 0 | At least 1.5 | X |
| Ex. 9 | HFO-1123/HFO-1234yf/HFO-1132a | 39.5 | 0 | 60 | 0 | 0.5 | ○ |
| Ex. 10 | HFO-1123/HFO-1234yf/HFO-1132a | At most 38.5 | 0 | 60 | 0 | At least 1.5 | X |
| Ex. 11 | HFO-1123/HFO-1234ze(E)/HFO-1132a | 79.5 | 0 | 0 | 20 | 0.5 | ○ |
| Ex. 12 | HFO-1123/HFO-1234ze(E)/HFO-1132a | At most 78.5 | 0 | 0 | 20 | At least 1.5 | X |
| Ex. 13 | HFO-1123/HFO-1234ze(E)/HFO-1132a | 59.5 | 0 | 0 | 40 | 0.5 | ○ |
| Ex. 14 | HFO-1123/HFO-1234ze(E)/HFO-1132a | At most 58.5 | 0 | 0 | 40 | At least 1.5 | X |
| Ex. 15 | HFO-1123/HFO-1234ze(E)/HFO-1132a | 38.5 | 0 | 0 | 60 | 0.5 | ○ |
| Ex. 16 | HFO-1123/HFO-1234ze(E)/HFO-1132a | At most 38.5 | 0 | 0 | 60 | At least 1.5 | X |

TABLE 4

| | Component | HFO-1123 | HFC-32 | HFO-1234yf | HFO-1234ze(E) | Proportion of HFO-1132a based on working fluid (mass %) | Refrigerating capacity |
|---|---|---|---|---|---|---|---|
| Ex. 17 | HFO-1123/HFC-32/HFO-1234yf/HFO-1132a | 19.5 | 30 | 50 | 0 | 0.5 | ○ |
| Ex. 18 | HFO-1123/HFC-32/HFO-1234yf/HFO-1132a | At most 18.5 | 30 | 50 | 0 | At least 1.5 | X |
| Ex. 19 | HFO-1123/HFC-32/HFO-1234yf/HFO-1132a | 19.5 | 40 | 40 | 0 | 0.5 | ○ |
| Ex. 20 | HFO-1123/HFC-32/HFO-1234yf/HFO-1132a | At most 18.5 | 40 | 40 | 0 | At least 1.5 | X |
| Ex. 21 | HFO-1123/HFC-32/HFO-1234yf/HFO-1132a | 19.5 | 50 | 30 | 0 | 0.5 | ○ |
| Ex. 22 | HFO-1123/HFC-32/HFO-1234yf/HFO-1132a | At most 18.5 | 50 | 30 | 0 | At least 1.5 | X |
| Ex. 23 | HFO-1123/HFC-32/HFO-1234yf/HFO-1132a | 19.5 | 60 | 20 | 0 | 0.5 | ○ |
| Ex. 24 | HFO-1123/HFC-32/HFO-1234yf/HFO-1132a | At most 18.5 | 60 | 20 | 0 | At least 1.5 | X |
| Ex. 25 | HFO-1123/HFC-32/HFO-1234yf/HFO-1132a | 19.5 | 70 | 10 | 0 | 0.5 | ○ |
| Ex. 26 | HFO-1123/HFC-32/HFO-1234yf/HFO-1132a | At most 18.5 | 70 | 10 | 0 | At least 1.5 | X |
| Ex. 27 | HFO-1123/HFC-32/HFO-1234yf/HFO-1132a | 29.5 | 30 | 40 | 0 | 0.5 | ○ |
| Ex. 28 | HFO-1123/HFC-32/HFO-1234yf/HFO-1132a | At most 28.5 | 30 | 40 | 0 | At least 1.5 | X |
| Ex. 29 | HFO-1123/HFC-32/HFO-1234yf/HFO-1132a | 29.5 | 40 | 30 | 0 | 0.5 | ○ |
| Ex. 30 | HFO-1123/HFC-32/HFO-1234yf/HFO-1132a | At most 28.5 | 40 | 30 | 0 | At least 1.5 | X |
| Ex. 31 | HFO-1123/HFC-32/HFO-1234yf/HFO-1132a | 29.5 | 50 | 20 | 0 | 0.5 | ○ |
| Ex. 32 | HFO-1123/HFC-32/HFO-1234yf/HFO-1132a | At most 28.5 | 50 | 20 | 0 | At least 1.5 | X |
| Ex. 33 | HFO-1123/HFC-32/HFO-1234yf/HFO-1132a | 29.5 | 60 | 10 | 0 | 0.5 | ○ |
| Ex. 34 | HFO-1123/HFC-32/HFO-1234yf/HFO-1132a | At most 28.5 | 60 | 10 | 0 | At least 1.5 | X |
| Ex. 35 | HFO-1123/HFC-32/HFO-1234yf/HFO-1132a | 39.5 | 30 | 30 | 0 | 0.5 | ○ |
| Ex. 36 | HFO-1123/HFC-32/HFO-1234yf/HFO-1132a | At most 38.5 | 30 | 30 | 0 | At least 1.5 | X |
| Ex. 37 | HFO-1123/HFC-32/HFO-1234yf/HFO-1132a | 39.5 | 40 | 20 | 0 | 0.5 | ○ |
| Ex. 38 | HFO-1123/HFC-32/HFO-1234yf/HFO-1132a | At most 38.5 | 40 | 20 | 0 | At least 1.5 | X |
| Ex. 39 | HFO-1123/HFC-32/HFO-1234yf/HFO-1132a | 39.5 | 50 | 10 | 0 | 0.5 | ○ |
| Ex. 40 | HFO-1123/HFC-32/HFO-1234yf/HFO-1132a | At most 38.5 | 50 | 10 | 0 | At least 1.5 | X |
| Ex. 41 | HFO-1123/HFC-32/HFO-1234yf/HFO-1132a | 49.5 | 30 | 20 | 0 | 0.5 | ○ |
| Ex. 42 | HFO-1123/HFC-32/HFO-1234yf/HFO-1132a | At most 48.5 | 30 | 20 | 0 | At least 1.5 | X |
| Ex. 43 | HFO-1123/HFC-32/HFO-1234yf/HFO-1132a | 49.5 | 40 | 10 | 0 | 0.5 | ○ |
| Ex. 44 | HFO-1123/HFC-32/HFO-1234yf/HFO-1132a | At most 48.5 | 40 | 10 | 0 | At least 1.5 | X |
| Ex. 45 | HFO-1123/HFC-32/HFO-1234yf/HFO-1132a | 59.5 | 30 | 10 | 0 | 0.5 | ○ |
| Ex. 46 | HFO-1123/HFC-32/HFO-1234yf/HFO-1132a | At most 58.5 | 30 | 10 | 0 | At least 1.5 | X |

TABLE 5

| | Component | HFO-1123 | HFC-32 | HFO-1234yf | HFO-1234ze(E) | Proportion of HFO-1132a based on working fluid (mass %) | Refrigerating capacity |
|---|---|---|---|---|---|---|---|
| Ex. 47 | HFO-1123/HFC-32/HFO-1234yf/HFO-1132a | 39.5 | 55 | 5 | 0 | 0.5 | ○ |
| Ex. 48 | HFO-1123/HFC-32/HFO-1234yf/HFO-1132a | At most 38.5 | 55 | 5 | 0 | At least 1.5 | X |
| Ex. 49 | HFO-1123/HFC-32/HFO-1234yf/HFO-1132a | 39.5 | 45 | 15 | 0 | 0.5 | ○ |
| Ex. 50 | HFO-1123/HFC-32/HFO-1234yf/HFO-1132a | At most 38.5 | 45 | 15 | 0 | At least 1.5 | X |
| Ex. 51 | HFO-1123/HFC-32/HFO-1234yf/HFO-1132a | 39.5 | 35 | 25 | 0 | 0.5 | ○ |
| Ex. 52 | HFO-1123/HFC-32/HFO-1234yf/HFO-1132a | At most 38.5 | 35 | 25 | 0 | At least 1.5 | X |
| Ex. 53 | HFO-1123/HFC-32/HFO-1234yf/HFO-1132a | 44.5 | 50 | 5 | 0 | 0.5 | ○ |
| Ex. 54 | HFO-1123/HFC-32/HFO-1234yf/HFO-1132a | At most 43.5 | 50 | 5 | 0 | At least 1.5 | X |
| Ex. 55 | HFO-1123/HFC-32/HFO-1234yf/HFO-1132a | 44.5 | 45 | 10 | 0 | 0.5 | ○ |
| Ex. 56 | HFO-1123/HFC-32/HFO-1234yf/HFO-1132a | At most 43.5 | 45 | 10 | 0 | At least 1.5 | X |
| Ex. 57 | HFO-1123/HFC-32/HFO-1234yf/HFO-1132a | 44.5 | 40 | 15 | 0 | 0.5 | ○ |
| Ex. 58 | HFO-1123/HFC-32/HFO-1234yf/HFO-1132a | At most 43.5 | 40 | 15 | 0 | At least 1.5 | X |
| Ex. 59 | HFO-1123/HFC-32/HFO-1234yf/HFO-1132a | 44.5 | 35 | 20 | 0 | 0.5 | ○ |
| Ex. 60 | HFO-1123/HFC-32/HFO-1234yf/HFO-1132a | At most 43.5 | 35 | 20 | 0 | At least 1.5 | X |
| Ex. 61 | HFO-1123/HFC-32/HFO-1234yf/HFO-1132a | 44.5 | 30 | 25 | 0 | 0.5 | ○ |
| Ex. 62 | HFO-1123/HFC-32/HFO-1234yf/HFO-1132a | At most 43.5 | 30 | 25 | 0 | At least 1.5 | X |
| Ex. 63 | HFO-1123/HFC-32/HFO-1234yf/HFO-1132a | 44.5 | 25 | 30 | 0 | 0.5 | ○ |
| Ex. 64 | HFO-1123/HFC-32/HFO-1234yf/HFO-1132a | At most 43.5 | 25 | 30 | 0 | At least 1.5 | X |
| Ex. 65 | HFO-1123/HFC-32/HFO-1234yf/HFO-1132a | 49.5 | 45 | 5 | 0 | 0.5 | ○ |
| Ex. 66 | HFO-1123/HFC-32/HFO-1234yf/HFO-1132a | At most 48.5 | 45 | 5 | 0 | At least 1.5 | X |
| Ex. 67 | HFO-1123/HFC-32/HFO-1234yf/HFO-1132a | 49.5 | 35 | 15 | 0 | 0.5 | ○ |
| Ex. 68 | HFO-1123/HFC-32/HFO-1234yf/HFO-1132a | At most 48.5 | 35 | 15 | 0 | At least 1.5 | X |
| Ex. 69 | HFO-1123/HFC-32/HFO-1234yf/HFO-1132a | 49.5 | 25 | 25 | 0 | 0.5 | ○ |
| Ex. 70 | HFO-1123/HFC-32/HFO-1234yf/HFO-1132a | At most 48.5 | 25 | 25 | 0 | At least 1.5 | X |
| Ex. 71 | HFO-1123/HFC-32/HFO-1234yf/HFO-1132a | 54.5 | 40 | 5 | 0 | 0.5 | ○ |
| Ex. 72 | HFO-1123/HFC-32/HFO-1234yf/HFO-1132a | At most 53.5 | 40 | 5 | 0 | At least 1.5 | X |
| Ex. 73 | HFO-1123/HFC-32/HFO-1234yf/HFO-1132a | 54.5 | 35 | 10 | 0 | 0.5 | ○ |
| Ex. 74 | HFO-1123/HFC-32/HFO-1234yf/HFO-1132a | At most 53.5 | 35 | 10 | 0 | At least 1.5 | X |
| Ex. 75 | HFO-1123/HFC-32/HFO-1234yf/HFO-1132a | 54.5 | 30 | 15 | 0 | 0.5 | ○ |
| Ex. 76 | HFO-1123/HFC-32/HFO-1234yf/HFO-1132a | At most 53.5 | 30 | 15 | 0 | At least 1.5 | X |

TABLE 5-continued

| | Component | HFO-1123 | HFC-32 | HFO-1234yf | HFO-1234ze(E) | Proportion of HFO-1132a based on working fluid (mass %) | Refrigerating capacity |
|---|---|---|---|---|---|---|---|
| Ex. 77 | HFO-1123/HFC-32/HFO-1234yf/HFO-1132a | 54.5 | 25 | 20 | 0 | 0.5 | ○ |
| Ex. 78 | HFO-1123/HFC-32/HFO-1234yf/HFO-1132a | At most 53.5 | 25 | 20 | 0 | At least 1.5 | X |
| Ex. 79 | HFO-1123/HFC-32/HFO-1234yf/HFO-1132a | 54.5 | 20 | 25 | 0 | 0.5 | ○ |
| Ex. 80 | HFO-1123/HFC-32/HFO-1234yf/HFO-1132a | At most 53.5 | 20 | 25 | 0 | At least 1.5 | X |
| Ex. 81 | HFO-1123/HFC-32/HFO-1234yf/HFO-1132a | 54.5 | 15 | 30 | 0 | 0.5 | ○ |
| Ex. 82 | HFO-1123/HFC-32/HFO-1234yf/HFO-1132a | At most 53.5 | 15 | 30 | 0 | At least 1.5 | X |
| Ex. 83 | HFO-1123/HFC-32/HFO-1234yf/HFO-1132a | 29.5 | 45 | 25 | 0 | 0.5 | ○ |
| Ex. 84 | HFO-1123/HFC-32/HFO-1234yf/HFO-1132a | At most 28.5 | 45 | 25 | 0 | At least 1.5 | X |
| Ex. 85 | HFO-1123/HFC-32/HFO-1234yf/HFO-1132a | 29.5 | 55 | 15 | 0 | 0.5 | ○ |
| Ex. 86 | HFO-1123/HFC-32/HFO-1234yf/HFO-1132a | At most 28.5 | 55 | 15 | 0 | At least 1.5 | X |
| Ex. 87 | HFO-1123/HFC-32/HFO-1234yf/HFO-1132a | 29.5 | 65 | 5 | 0 | 0.5 | ○ |
| Ex. 88 | HFO-1123/HFC-32/HFO-1234yf/HFO-1132a | At most 28.5 | 65 | 5 | 0 | At least 1.5 | X |
| Ex. 89 | HFO-1123/HFC-32/HFO-1234yf/HFO-1132a | 34.5 | 35 | 30 | 0 | 0.5 | ○ |
| Ex. 90 | HFO-1123/HFC-32/HFO-1234yf/HFO-1132a | At most 33.5 | 35 | 30 | 0 | At least 1.5 | X |
| Ex. 91 | HFO-1123/HFC-32/HFO-1234yf/HFO-1132a | 34.5 | 40 | 25 | 0 | 0.5 | ○ |
| Ex. 92 | HFO-1123/HFC-32/HFO-1234yf/HFO-1132a | At most 33.5 | 40 | 25 | 0 | At least 1.5 | X |
| Ex. 93 | HFO-1123/HFC-32/HFO-1234yf/HFO-1132a | 34.5 | 45 | 20 | 0 | 0.5 | ○ |
| Ex. 94 | HFO-1123/HFC-32/HFO-1234yf/HFO-1132a | At most 33.5 | 45 | 20 | 0 | At least 1.5 | X |
| Ex. 95 | HFO-1123/HFC-32/HFO-1234yf/HFO-1132a | 34.5 | 50 | 15 | 0 | 0.5 | ○ |
| Ex. 96 | HFO-1123/HFC-32/HFO-1234yf/HFO-1132a | At most 33.5 | 50 | 15 | 0 | At least 1.5 | X |
| Ex. 97 | HFO-1123/HFC-32/HFO-1234yf/HFO-1132a | 34.5 | 55 | 10 | 0 | 0.5 | ○ |
| Ex. 98 | HFO-1123/HFC-32/HFO-1234yf/HFO-1132a | At most 33.5 | 55 | 10 | 0 | At least 1.5 | X |
| Ex. 99 | HFO-1123/HFC-32/HFO-1234yf/HFO-1132a | 34.5 | 60 | 5 | 0 | 0.5 | ○ |
| Ex. 100 | HFO-1123/HFC-32/HFO-1234yf/HFO-1132a | At most 33.5 | 60 | 5 | 0 | At least 1.5 | X |

TABLE 6

| | Component | HFO-1123 | HFC-32 | HFO-1234yf | HFO-1234ze(E) | Proportion of HFO-1132a based on working fluid (mass %) | Refrigerating capacity |
|---|---|---|---|---|---|---|---|
| Ex. 101 | HFO-1123/HFC-32/HFO-1234yf/HFO-1132a | 9.5 | 40 | 50 | 0 | 0.5 | ○ |
| Ex. 102 | HFO-1123/HFC-32/HFO-1234yf/HFO-1132a | At most 8.5 | 40 | 50 | 0 | At least 1.5 | X |
| Ex. 103 | HFO-1123/HFC-32/HFO-1234yf/HFO-1132a | 9.5 | 50 | 40 | 0 | 0.5 | ○ |
| Ex. 104 | HFO-1123/HFC-32/HFO-1234yf/HFO-1132a | At most 8.5 | 50 | 40 | 0 | At least 1.5 | X |
| Ex. 105 | HFO-1123/HFC-32/HFO-1234yf/HFO-1132a | 9.5 | 60 | 30 | 0 | 0.5 | ○ |
| Ex. 106 | HFO-1123/HFC-32/HFO-1234yf/HFO-1132a | At most 8.5 | 60 | 30 | 0 | At least 1.5 | X |
| Ex. 107 | HFO-1123/HFC-32/HFO-1234yf/HFO-1132a | 9.5 | 70 | 20 | 0 | 0.5 | ○ |
| Ex. 108 | HFO-1123/HFC-32/HFO-1234yf/HFO-1132a | At most 8.5 | 70 | 20 | 0 | At least 1.5 | X |
| Ex. 109 | HFO-1123/HFC-32/HFO-1234yf/HFO-1132a | 39.5 | 10 | 50 | 0 | 0.5 | ○ |
| Ex. 110 | HFO-1123/HFC-32/HFO-1234yf/HFO-1132a | At most 38.5 | 10 | 50 | 0 | At least 1.5 | X |
| Ex. 111 | HFO-1123/HFC-32/HFO-1234yf/HFO-1132a | 49.5 | 10 | 40 | 0 | 0.5 | ○ |
| Ex. 112 | HFO-1123/HFC-32/HFO-1234yf/HFO-1132a | At most 48.5 | 10 | 40 | 0 | At least 1.5 | X |
| Ex. 113 | HFO-1123/HFC-32/HFO-1234yf/HFO-1132a | 59.5 | 10 | 30 | 0 | 0.5 | ○ |
| Ex. 114 | HFO-1123/HFC-32/HFO-1234yf/HFO-1132a | At most 58.5 | 10 | 30 | 0 | At least 1.5 | X |
| Ex. 115 | HFO-1123/HFC-32/HFO-1234yf/HFO-1132a | 69.5 | 10 | 20 | 0 | 0.5 | ○ |
| Ex. 116 | HFO-1123/HFC-32/HFO-1234yf/HFO-1132a | At most 68.5 | 10 | 20 | 0 | At least 1.5 | X |
| Ex. 117 | HFO-1123/HFC-32/HFO-1234yf/HFO-1132a | 79.5 | 10 | 10 | 0 | 0.5 | ○ |
| Ex. 118 | HFO-1123/HFC-32/HFO-1234yf/HFO-1132a | At most 78.5 | 10 | 10 | 0 | At least 1.5 | X |
| Ex. 119 | HFO-1123/HFC-32/HFO-1234yf/HFO-1132a | 39.5 | 20 | 40 | 0 | 0.5 | ○ |
| Ex. 120 | HFO-1123/HFC-32/HFO-1234yf/HFO-1132a | At most 38.5 | 20 | 40 | 0 | At least 1.5 | X |
| Ex. 121 | HFO-1123/HFC-32/HFO-1234yf/HFO-1132a | 49.5 | 20 | 30 | 0 | 0.5 | ○ |
| Ex. 122 | HFO-1123/HFC-32/HFO-1234yf/HFO-1132a | At most 48.5 | 20 | 30 | 0 | At least 1.5 | X |
| Ex. 123 | HFO-1123/HFC-32/HFO-1234yf/HFO-1132a | 59.5 | 20 | 20 | 0 | 0.5 | ○ |
| Ex. 124 | HFO-1123/HFC-32/HFO-1234yf/HFO-1132a | At most 58.5 | 20 | 20 | 0 | At least 1.5 | X |
| Ex. 125 | HFO-1123/HFC-32/HFO-1234yf/HFO-1132a | 69.5 | 20 | 10 | 0 | 0.5 | ○ |
| Ex. 126 | HFO-1123/HFC-32/HFO-1234yf/HFO-1132a | At most 68.5 | 20 | 10 | 0 | At least 1.5 | X |

TABLE 7

| | Component | HFO-1123 | HFC-32 | HFO-1234yf | HFO-1234ze(E) | HFO-1132a based on working fluid (mass %) | Refrigerating capacity |
|---|---|---|---|---|---|---|---|
| Ex. 127 | HFO-1123/HFC-32/HFO-1234ze(E)/HFO-1132a | 9.5 | 75 | 0 | 15 | 0.5 | ○ |
| Ex. 128 | HFO-1123/HFC-32/HFO-1234ze(E)/HFO-1132a | At most 8.5 | 75 | 0 | 15 | At least 1.5 | X |
| Ex. 129 | HFO-1123/HFC-32/HFO-1234ze(E)/HFO-1132a | 9.5 | 60 | 0 | 30 | 0.5 | ○ |
| Ex. 130 | HFO-1123/HFC-32/HFO-1234ze(E)/HFO-1132a | At most 8.5 | 60 | 0 | 30 | At least 1.5 | X |
| Ex. 131 | HFO-1123/HFC-32/HFO-1234ze(E)/HFO-1132a | 9.5 | 44 | 0 | 46 | 0.5 | ○ |
| Ex. 132 | HFO-1123/HFC-32/HFO-1234ze(E)/HFO-1132a | At most 8.5 | 44 | 0 | 46 | At least 1.5 | X |
| Ex. 133 | HFO-1123/HFC-32/HFO-1234ze(E)/HFO-1132a | 9.5 | 40 | 0 | 50 | 0.5 | ○ |
| Ex. 134 | HFO-1123/HFC-32/HFO-1234ze(E)/HFO-1132a | At most 8.5 | 40 | 0 | 50 | At least 1.5 | X |
| Ex. 135 | HFO-1123/HFC-32/HFO-1234ze(E)/HFO-1132a | 14.5 | 40 | 0 | 45 | 0.5 | ○ |
| Ex. 136 | HFO-1123/HFC-32/HFO-1234ze(E)/HFO-1132a | At most 13.5 | 40 | 0 | 45 | At least 1.5 | X |
| Ex. 137 | HFO-1123/HFC-32/HFO-1234ze(E)/HFO-1132a | 19.5 | 75 | 0 | 5 | 0.5 | ○ |
| Ex. 138 | HFO-1123/HFC-32/HFO-1234ze(E)/HFO-1132a | At most 18.5 | 75 | 0 | 5 | At least 1.5 | X |
| Ex. 139 | HFO-1123/HFC-32/HFO-1234ze(E)/HFO-1132a | 19.5 | 60 | 0 | 20 | 0.5 | ○ |
| Ex. 140 | HFO-1123/HFC-32/HFO-1234ze(E)/HFO-1132a | At most 18.5 | 60 | 0 | 20 | At least 1.5 | X |
| Ex. 141 | HFO-1123/HFC-32/HFO-1234ze(E)/HFO-1132a | 19.5 | 44 | 0 | 36 | 0.5 | ○ |
| Ex. 142 | HFO-1123/HFC-32/HFO-1234ze(E)/HFO-1132a | At most 18.5 | 44 | 0 | 36 | At least 1.5 | X |
| Ex. 143 | HFO-1123/HFC-32/HFO-1234ze(E)/HFO-1132a | 19.5 | 40 | 0 | 40 | 0.5 | ○ |
| Ex. 144 | HFO-1123/HFC-32/HFO-1234ze(E)/HFO-1132a | At most 18.5 | 40 | 0 | 40 | At least 1.5 | X |
| Ex. 145 | HFO-1123/HFC-32/HFO-1234ze(E)/HFO-1132a | 29.5 | 40 | 0 | 30 | 0.5 | ○ |
| Ex. 146 | HFO-1123/HFC-32/HFO-1234ze(E)/HFO-1132a | At most 28.5 | 40 | 0 | 30 | At least 1.5 | X |
| Ex. 147 | HFO-1123/HFC-32/HFO-1234ze(E)/HFO-1132a | 29.5 | 30 | 0 | 40 | 0.5 | ○ |
| Ex. 148 | HFO-1123/HFC-32/HFO-1234ze(E)/HFO-1132a | At most 28.5 | 30 | 0 | 40 | At least 1.5 | X |
| Ex. 149 | HFO-1123/HFC-32/HFO-1234ze(E)/HFO-1132a | 39.5 | 40 | 0 | 20 | 0.5 | ○ |
| Ex. 150 | HFO-1123/HFC-32/HFO-1234ze(E)/HFO-1132a | At most 38.5 | 40 | 0 | 20 | At least 1.5 | X |
| Ex. 151 | HFO-1123/HFC-32/HFO-1234ze(E)/HFO-1132a | 39.5 | 20 | 0 | 40 | 0.5 | ○ |
| Ex. 152 | HFO-1123/HFC-32/HFO-1234ze(E)/HFO-1132a | At most 38.5 | 20 | 0 | 40 | At least 1.5 | X |
| Ex. 153 | HFO-1123/HFC-32/HFO-1234ze(E)/HFO-1132a | 49.5 | 40 | 0 | 10 | 0.5 | ○ |
| Ex. 154 | HFO-1123/HFC-32/HFO-1234ze(E)/HFO-1132a | At most 48.5 | 40 | 0 | 10 | At least 1.5 | X |
| Ex. 155 | HFO-1123/HFC-32/HFO-1234ze(E)/HFO-1132a | 49.5 | 20 | 0 | 30 | 0.5 | ○ |
| Ex. 156 | HFO-1123/HFC-32/HFO-1234ze(E)/HFO-1132a | At most 48.5 | 20 | 0 | 30 | At least 1.5 | X |
| Ex. 157 | HFO-1123/HFC-32/HFO-1234ze(E)/HFO-1132a | 49.5 | 10 | 0 | 40 | 0.5 | ○ |
| Ex. 158 | HFO-1123/HFC-32/HFO-1234ze(E)/HFO-1132a | At most 48.5 | 10 | 0 | 40 | At least 1.5 | X |
| Ex. 159 | HFO-1123/HFC-32/HFO-1234ze(E)/HFO-1132a | 50.5 | 44 | 0 | 5 | 0.5 | ○ |
| Ex. 160 | HFO-1123/HFC-32/HFO-1234ze(E)/HFO-1132a | At most 49.5 | 44 | 0 | 5 | At least 1.5 | X |
| Ex. 161 | HFO-1123/HFC-32/HFO-1234ze(E)/HFO-1132a | 64.5 | 30 | 0 | 5 | 0.5 | ○ |
| Ex. 162 | HFO-1123/HFC-32/HFO-1234ze(E)/HFO-1132a | At most 63.5 | 30 | 0 | 5 | At least 1.5 | X |
| Ex. 163 | HFO-1123/HFC-32/HFO-1234ze(E)/HFO-1132a | 79.5 | 15 | 0 | 5 | 0.5 | ○ |
| Ex. 164 | HFO-1123/HFC-32/HFO-1234ze(E)/HFO-1132a | At most 78.5 | 15 | 0 | 5 | At least 1.5 | X |

It is found from Tables 3 to 7 that the working fluids in odd-numbered Ex. among Ex. 1 to 3 and 5 to 163, containing HFO-1123, HFC-32 and/or HFO-1234yf, HFO-1234ze(E) and HFO-1132a, and having a proportion of the content of HFO-1132a based on the working fluids of less than 1.5 mass %, are excellent in the refrigerating capacity Q. Whereas the working fluids in even-numbered Ex. among Ex. 4 to 164 having a proportion of the content of HFO-1132a based on the working fluid of at least 1.5 mass % are inferior in the refrigerating capacity Q.

INDUSTRIAL APPLICABILITY

The working fluid for heat cycle of the present invention is useful for a refrigerating apparatus (such as a built-in showcase, a separate showcase, an industrial fridge freezer, a vending machine and an ice making machine), an air-conditioning apparatus (such as a room air-conditioner, a store package air-conditioner, a building package air-conditioner, a plant package air-conditioner, a gas engine heat pump, a train air-conditioning system and an automobile air-conditioning system), a power generation system (such as exhaust heat recovery power generation) and a heat transport apparatus (such as a heat pipe).

This application is a continuation of PCT Application No. PCT/JP2015/054637, filed on Feb. 19, 2015, which is based upon and claims the benefit of priority from Japanese Patent Application No. 2014-030855 filed on Feb. 20, 2014, Japanese Patent Application No. 2014-127747 filed on Jun. 20, 2014 and Japanese Patent Application No. 2014-148346 filed on Jul. 18, 2014. The contents of those applications are incorporated herein by reference in their entireties.

REFERENCE SYMBOLS

10: refrigerating cycle system, 11: compressor, 12: condenser, 13: expansion valve, 14: evaporator, 15, 16: pump

What is claimed is:

1. A working fluid for heat cycle, comprising trifluoroethylene and difluoroethylene, wherein the proportion of the content of trifluoroethylene is at least 8.5 mass % based on the working fluid, and the proportion of the content of difluoroethylene is at least 4 ppm and less than 1.5 mass % based on the working fluid.

2. The working fluid for heat cycle according to claim 1, wherein difluoroethylene is 1,1-difluoroethylene.

3. The working fluid for heat cycle according to claim 1, wherein the proportion of the content of difluoroethylene is at most 0.5 mass % based on the working fluid.

4. The working fluid for heat cycle according to claim 1, wherein the proportion of the content of trifluoroethylene is at least 10 mass % based on the entire amount of the working fluid.

5. The working fluid for heat cycle according to claim 1, wherein the proportion of the content of trifluoroethylene is at most 70 mass % based on the entire amount of the working fluid.

6. The working fluid for heat cycle according to claim 1, further comprising difluoromethane and 2,3,3,3-tetrafluoropropene.

7. The working fluid for heat cycle according to claim 1, further comprising difluoromethane and trans-1,3,3,3-tetrafluoropropene.

8. The working fluid for heat cycle according to claim 1, which further comprises a hydrofluorocarbon and/or a hydrofluoroolefin.

9. The working fluid for heat cycle according to claim 8, wherein the hydrofluorocarbon is difluoromethane.

10. The working fluid for heat cycle according to claim 8, wherein the hydrofluoroolefin is 2,3,3,3-tetrafluoropropene.

11. The working fluid for heat cycle according to claim 8, wherein the hydrofluoroolefin is trans-1,3,3,3-tetrafluoropropene.

* * * * *